July 22, 1969  H. E. R. PAPST  3,456,903
AIRSHIP
Filed April 7, 1967  4 Sheets-Sheet 2

INVENTOR
HERMANN ERNST ROBERT PAPST
BY Cushman, Darby & Cushman
ATTORNEYS

July 22, 1969  T. R. D. FOOTE  3,456,664
JET PROPULSION ENGINES
Filed March 8, 1966  10 Sheets-Sheet 4

Inventor
TERENCE ROY DENIS FOOTE
By
Bailey, Stephens & Nutting
Attorneys

United States Patent Office 3,456,664
Patented July 22, 1969

3,456,664
JET PROPULSION ENGINES
Terence Roy Denis Foote, Bristol, England, assignor, by mesne assignments, to Rolls-Royce Ltd., a British corporation
Filed Mar. 8, 1966, Ser. No. 532,803
Claims priority, application Great Britain, Mar. 12, 1965, 10,716/65
Int. Cl. F02k 7/10; F02b 27/02
U.S. Cl. 137—15.2     8 Claims

ABSTRACT OF THE DISCLOSURE

A supersonic air-intake for a jet propulsion engine, one wall of which can be deformed to adapt to different flight Mach numbers, different parts of the wall constituting a compressor ramp, a throat part and a diffuser part, there being transverse vanes pivotally mounted at the throat which have tapered leading and trailing edges and have a body of substantial thickness lying between the tapers, so that the vanes divide the throat portion into a plurality of convergent-divergent passages, the vanes being movable in conjunction with the deformation of the wall to ensure that the lower surface at the leading edge of each vane lies parallel to the compressor ramp. The vanes can be interlinked, and each can consists of portions hinged together. The throat passages preferably cause upwardly-rearwardly extending shock waves to start from one or more parts of the lower wall, but are adapted not to reflect the same waves downwards from the upper wall.

---

The invention relates to air intakes for supersonic jet propulsion power plants, the intakes being of the kind comprising a duct having a throat portion preceded by a compressor portion and followed by a divergent diffuser portion, a duct wall which is deformable to vary the cross-section of the throat portion and the convergent and divergent angles of the compressor portion and diffuser portion respectively.

In the divergent portion, which constitutes a subsonic diffuser, it is preferable that the rate of divergence be kept sufficiently low, especially in those regions in which the speed of flow exceeds Mach 0.5, to avoid substantial losses due to separation of the flow from the walls. Moreover it is usually required to reduce the speed of flow to Mach 0.25 or less, depending upon whether the air is delivered directly to a combustion system, as in a ramjet power plant, or to a mechanical compressor, as in a turbojet power plant.

For flight speeds several times greater than the speed of sound the required throat area of the intake becomes only a small fraction of the capture area or of the area at the outlet of the subsonic diffuser. The intake would seem therefore, to need to be made very long in comparison with the throat area, to achieve suitable ramp incidence angles and subsonic diffuser divergence angles for efficient diffusion. Furthermore, the walls of the intake, especially those parts defining the subsonic diffuser, need to be constructed to carry substantial pressure loadings, so that it is important to reduce their lengths to the minimum consistent with the maintenance of necessary aerodynamic characteristics.

According to the invention an air intake of the kind described has at least one vane in the throat portion, by which the air passage through the throat portion is restricted and divided, the vane extending transversely of the throat portion, being formed to define convergent-divergent air passages through the throat portion, and being adjustable about a transverse axis to match the disposition of the deformable wall.

Preferably there is at least one further vane in the throat, lying generally parallel to and spaced apart from the first one; preferably all the vanes are pivotally mounted on a system of parallel links supported from the deformable wall.

Each vane preferably has acutely tapering leading and trailing edges and is of a form to define in conjunction with at least another vane, a passage having a parallel portion.

The invention is illustrated by the examples shown in the accompanying drawings, which are designed for operation up to a flight speed of Mach 5. In the drawings.

Figure 1:
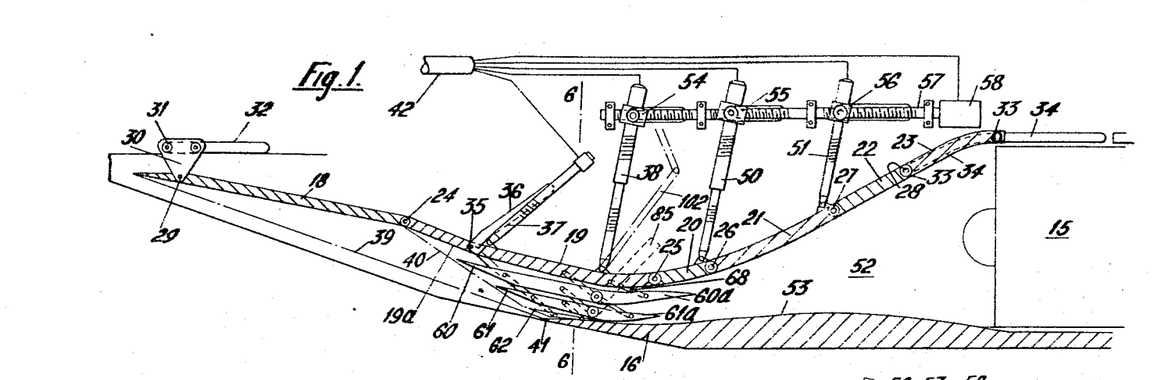
FIGURE 1 is a vertical-longitudinal section through a first intake, with the parts in their Mach 5 positions.
Figure 2:
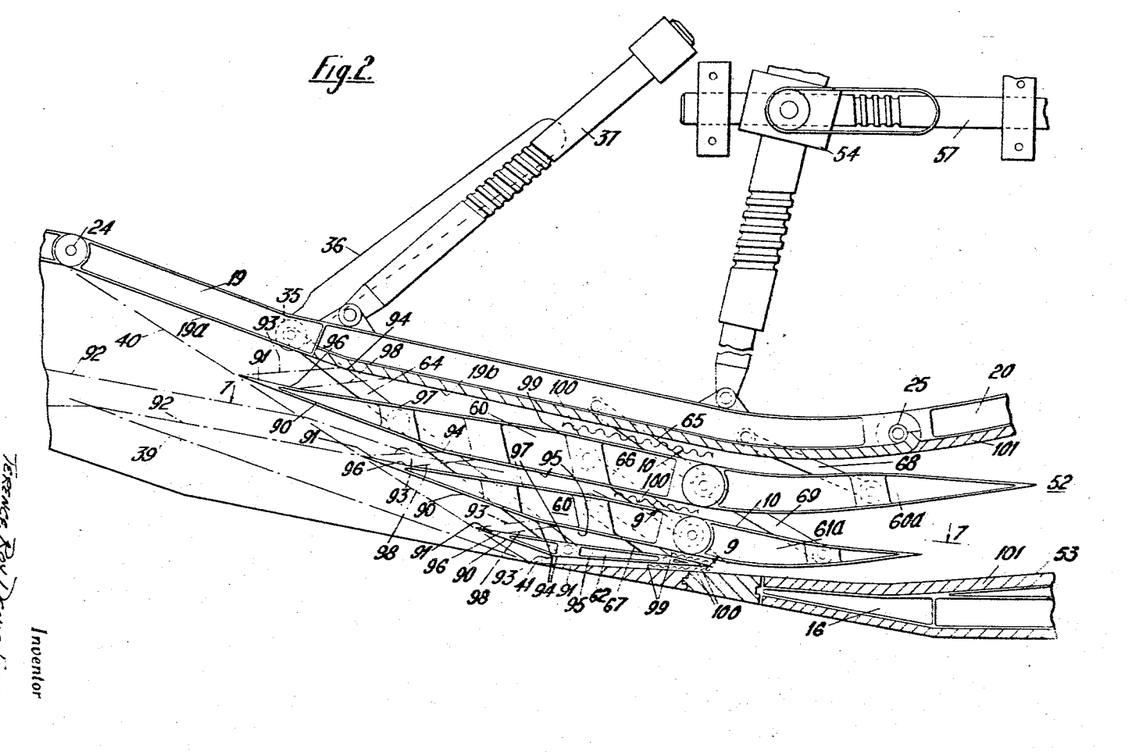
FIGURE 2 is a reproduction of a central part of FIGURE 1 on a larger scale.
Figure 3:
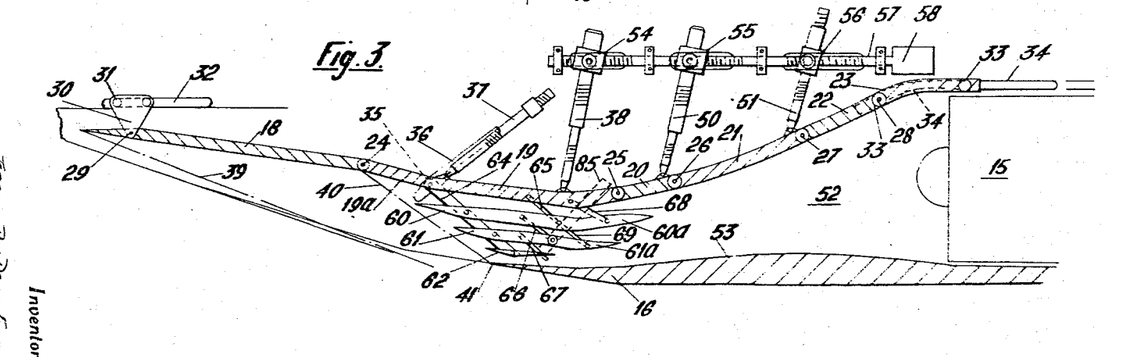
FIGURE 3 shows the intake with the parts in their Mach 3 positions.
Figure 4:
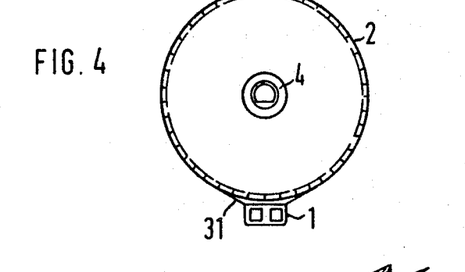
FIGURE 4 is a partially diagrammatic enlargement of a central part of FIGURE 3 to enable the shock wave configuration to be seen more clearly.
Figure 5:
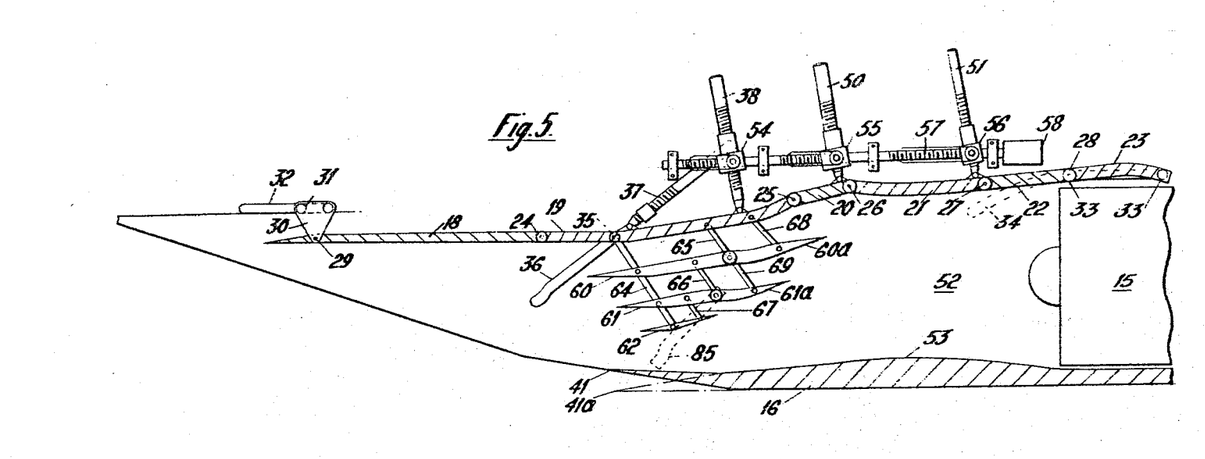
FIGURE 5 shows the intake with the parts in their Mach 1 positions.

FIGURES 1 to 10 show by way of example a first intake system comprising two intake passages arranged side by side, each supplying air to two gas turbine jet propulsion engines 15. Each passage is defined between the bottom 16 and parallel side walls 17 of a U-shaped structure fixed to the airframe (see FIGURE 6) one of the side walls being common to the two passages, and an adjustable ramp structure which is mounted for movement between the side walls and, as shown in FIGURES 1, 3 and 5, comprises six members 18 to 23 connected end to end by hinges 24 to 28; the ramp structure constitutes the deformable wall.

The foremost member 18 is pivoted at a point 29 near its leading edge to a trolley 30 with rollers 31 running in longitudinal guideways 32 fixed to the airframe, while the rearmost member 23 is provided with rollers 33 at each end running in curved guideways 34 adjacent to the engines, and also fixed to the airframe.

The ramp structure is located in respect of its fore and aft position by rollers 35 attached at a point along its second member 19 and running in straight guideways 36 carried by the side walls 17.

Up and down movement of the ramp members is effected by a number of pairs of screw jacks, preferably operated by air motors and having recirculating ball mechanism to reduce frictional losses. A first pair of jacks 37 is attached to each of the second members 19 adjacent to the rollers 35 and acts in the general direction of the guideways 36. A second pair of jacks 38 is attached to each of the second members 19 at a point near its rear end so as to control the angle of incidence of this member to the air flowing over the first member 18. The first member 18 is straight and constitutes a primary compression ramp which at supersonic speeds generates a primary shock wave 39 originating at its leading edge. A first part 19a of the second member 19 is also straight and constitutes a secondary compression ramp which at supersonic speeds generates a secondary shock wave 40 originating at its leading edge i.e. at the hinge 24.

The bottom wall 16 of each passage has a lip 41 at its forward end. The shape of the guideways 36 and the programming of the airmotors of the jacks 37 and 38 by a programme device 42, operated by a flight Machmeter 43, are such that at all supersonic flight Mach numbers in the operating range, the secondary shock wave 40 touches or passes close ahead of the lip 41; at the same time the primary shock wave 39 touches, or passes close ahead of the lip 41 at the higher Mach number (FIGURE 1) and passes ahead of it at lower Mach numbers by distances increasing with decrease of capture area with Mach number.

Third and fourth pairs of jacks 50 and 51 are attached to the members 20 and 21 near their rear ends and serve to maintain a reasonably smooth contour for the upper wall of the subsonic diffuser part 52 of the passage. It will be seen that owing to the height of the engine 15 being considerably more than that of the throat portion of the passage when adjusted for high speed operation of the aircraft, the passage 52 has to be swept fairly sharply upwards. With a flat bottom wall surface 53 this would produce an angle of divergence too large for stable flow conditions and the bottom surface is accordingly slightly humped downstream of the throat so as to reduce the divergence angle of the first half of the passage where the Mach number is above 0.5. At the upstream end of the passage vanes are introduced, as described below, which still further reduce the divergence angle.

As will be seen by comparing FIGURES 1 and 5 the pairs of jacks 38 and 50 have to provide a large range of movement; they are therefore of the double extension type. Furthermore, the jacks 38, 50 and 51 have movable pivoting points on blocks 54, 55 and 56 moved along guideways by screw threaded rods 57 operated by air motors 58. This avoids the objection of the top ends of the jacks sweeping through large arcs as the ramp members move upwards and rearwards to their Mach 1 positions shown in FIGURE 5. The air motors 58 and those of the jacks 50 and 51 are likewise controlled by the programme device 42.

Clearly with such an intake as it stands there are difficulties in obtaining efficient subsonic diffusion because of the necessarily short length of passage 52 provided for that purpose; for achieving supersonic compression by means of shock waves, one could at the most accommodate only on further one extending obliquely upwards from the lip 41.

The provision of three vanes 60, 61 and 62 to divide the passage in a region extending upstream and downstream of the throat overcomes this inadequacy of length. They can furthermore be readily formed and manipulated, to provide the optimum configurations of oblique shock waves and divergence angles, and further allow these to be readily varied with flight Mach number.

In this embodiment the vanes are made progressively shorter approaching the lip side of the passage, and the two longer vanes 60 and 61 are provided with hinged trailing ends parts 60a and 61a respectively. The third vane 62 and the forward parts of the vanes 60 and 61 are connected at each side to the second member 19 of the ramp structure by a parallel motion link system housed in recesses 63 in the side walls 17, and additional links determine the positions of the trailing end parts 60a and 61a.

The parallel motion system comprises at each side a forward link 64 connected to the second member 19 of the ramp structure and to each of the vanes. The rear end of the forward part of the vane 60 is then connected to the member 19 by a link 65, the rear end of the forward part of the vane 61 is connected to the vane 60 by a link 66 and the rear end of the vane 62 is connected to the vane 61 by a link 67. It will be seen therefore that in passing from the Mach 5 position shown in FIGURE 1 through the Mach 3 position shown in FIGURE 3 to the Mach 1 position shown in FIGURE 5, the vane 62 and the forward parts of the vanes 60 and 61 move downwards and forwards relatively to the ramp member, 19, their spacing increasing but their directions remaining parallel to that of the member 19.

During this movement it is desired that the trailing ends of the parts 60a and 61a should open out from one another and from the ramp system to a greater extent to provide better matching of the exit velocities of the streams of air flowing between them.

Figures 10, 14:
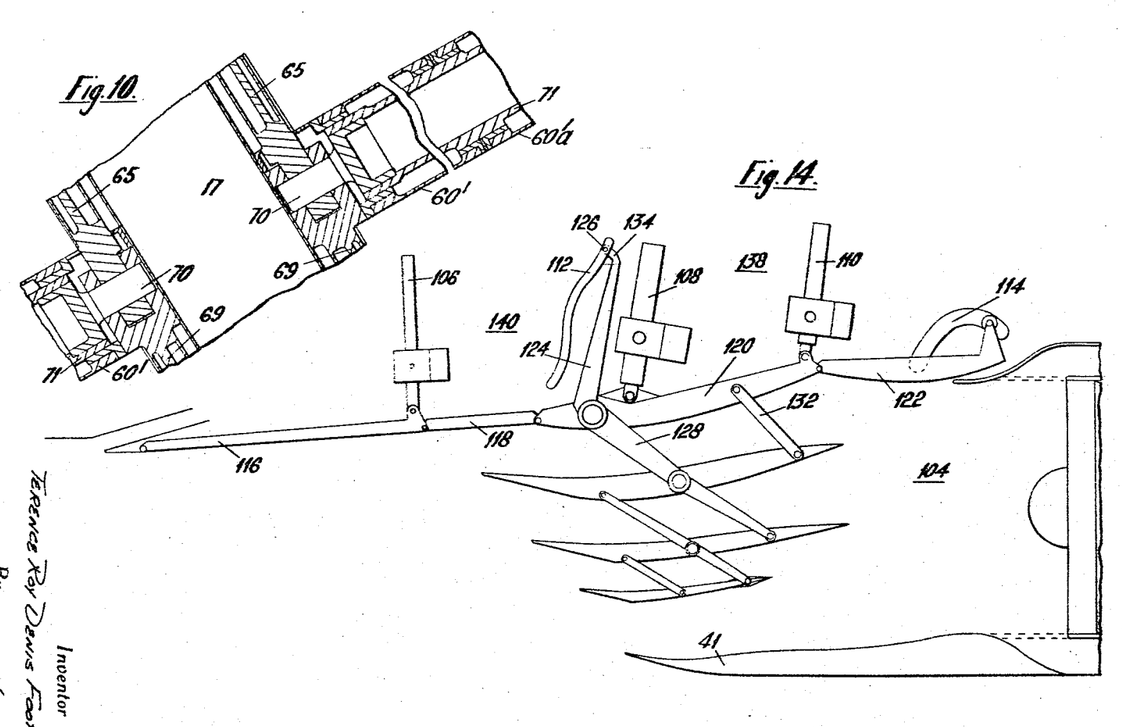
FIGURES 11 to 14 show a second arrangement embodying the invention, and corresponds to FIGURES 1, 2, 3, and 5, respectively.
Figure 11:
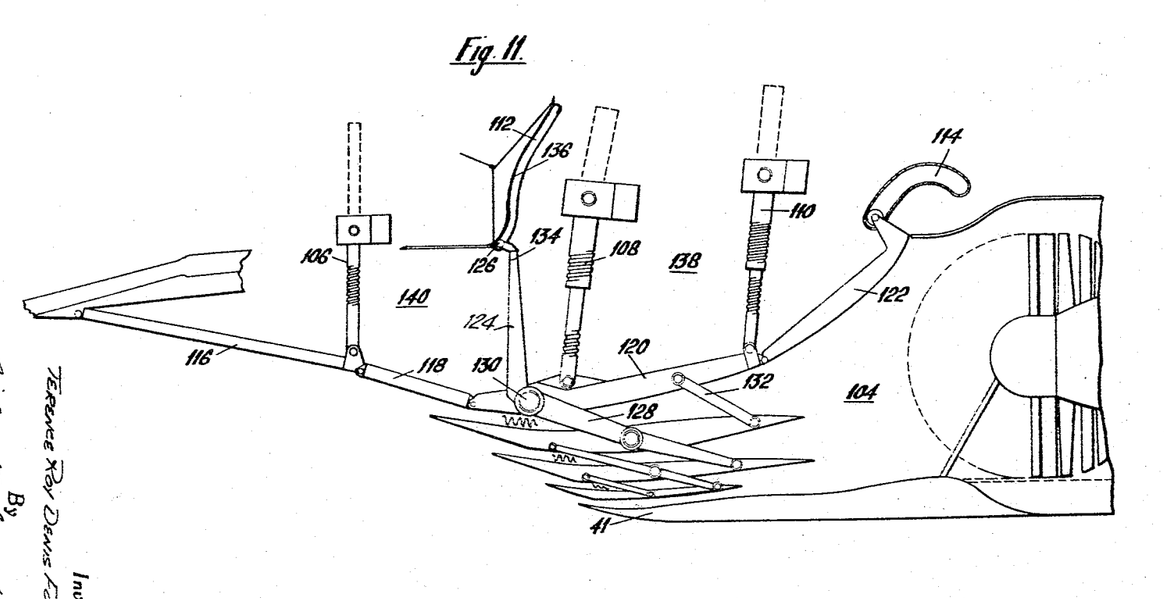
Figure 12:
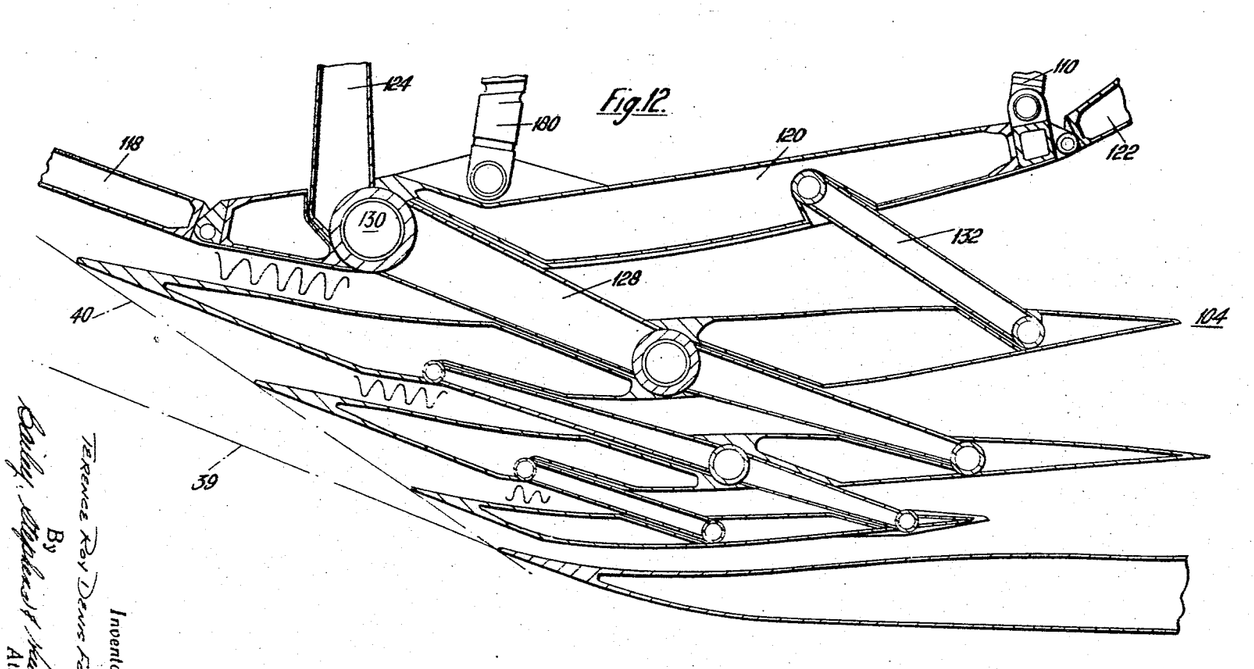
Figure 13:
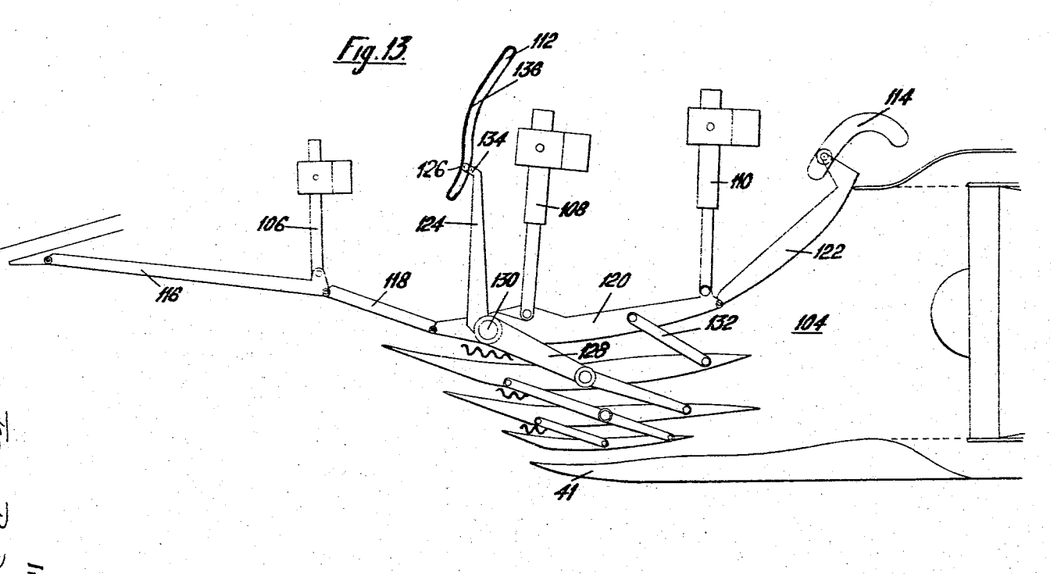

To achieve this the part 60a is connected to the part 19 by a link 68 which does not lie parallel to the link 65, and the part 61a is similarly connected to the vane 60 by a link 69. FIGURE 10 illustrates an arrangement of the joint between the links 65 and 69 and the parts 60 and 60a of the upper vane. At each end of the vane the two links engage a pivot 70 on a tubular cross shaft 71 on which the parts of the vane are journalled by means of interdigitated hinged parts $60^1$ and $60^1a$.

Figure 6:
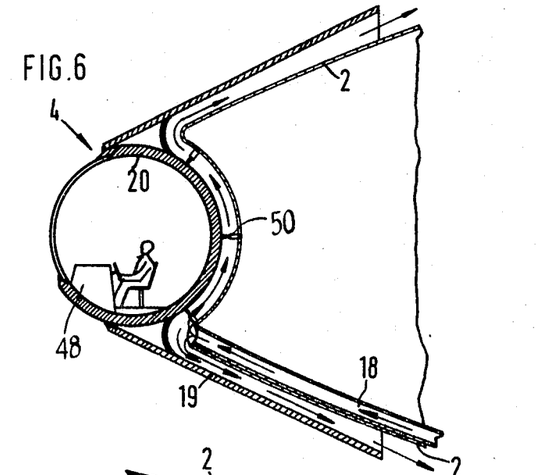
FIGURE 6 is a vertical transverse section at the line 6—6 in FIGURE 1.
Figure 7:
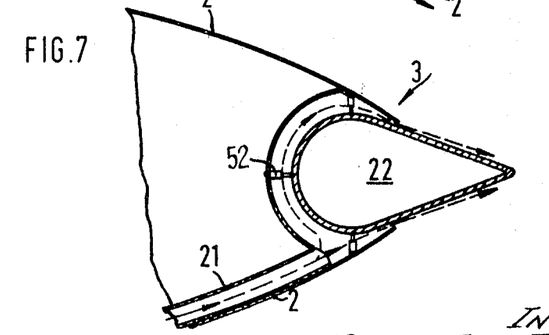
FIGURE 7 is a horizontal transverse section at the line 7—7 in FIGURES 2 and 6.
Figure 8:
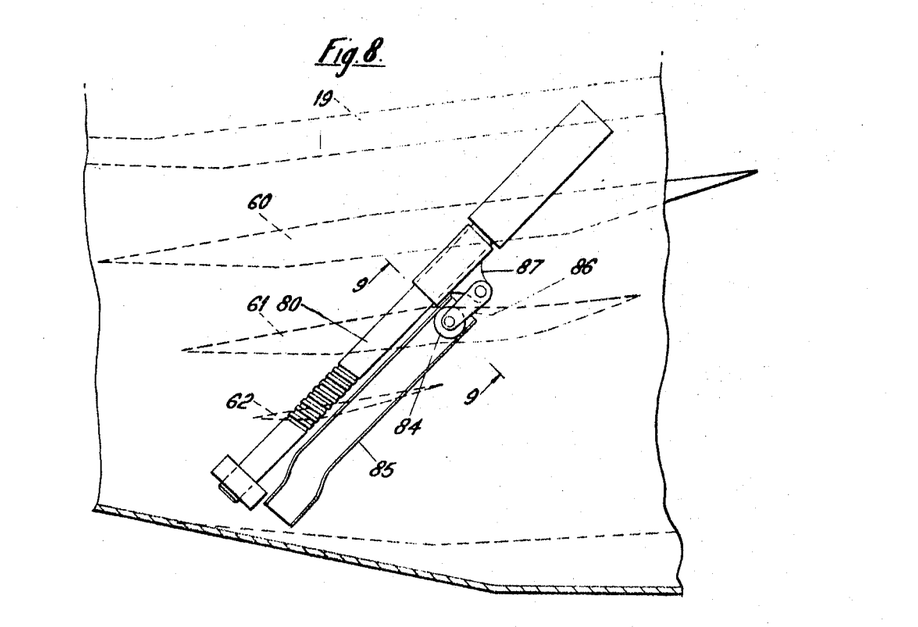
FIGURE 8 is a vertical longitudinal section at the line 8—8 in FIGURE 7.
Figure 9:
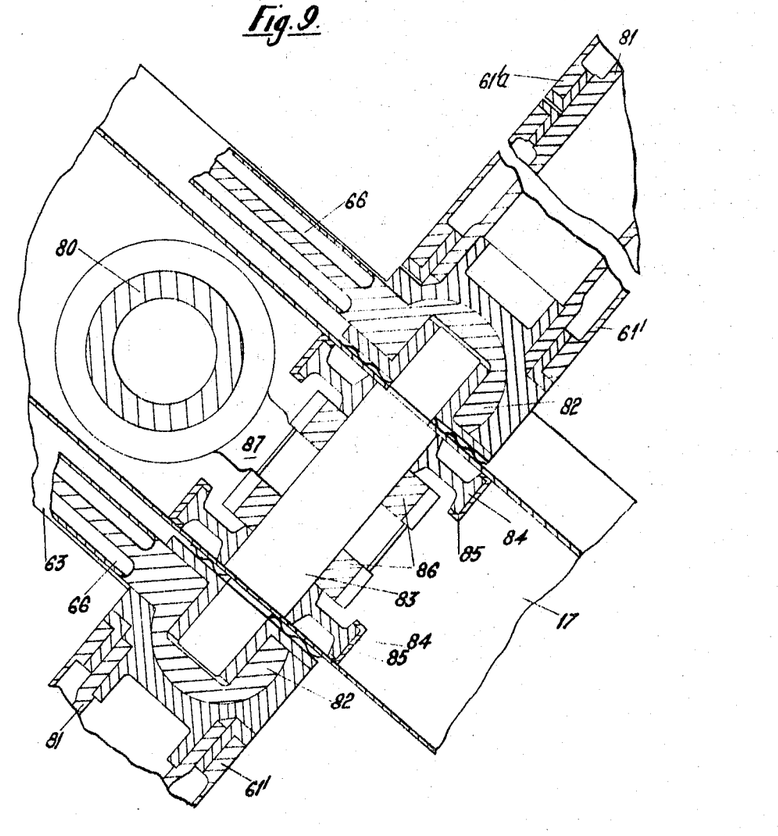
FIGURES 9 and 10 are sections at the lines 9—9 and 10—10 in FIGURE 2, the line 9—9 also being shown on FIGURE 8.

The movements of the vane system relative to the ramp structure are controlled by ball-screw jacks 80 with air motors located in the side walls 17, as shown more particularly in FIGURES 6, 8 and 9. The parts 61 and 61a of the middle vane are journalled by means of interdigitated hinge parts $61^1$ and $61^1a$ on a tubular cross shaft 81 having at each end a socket for reception of a part spherical end member 82 on the links 66. A pin 83 journalled in the end members 82 projects into the side wall 17 and carries two rollers 84 running in guideways 85 secured to the wall. A pair of short links 86 connect the pin 83 to a bracket 87 on the jack 80 which extends generally parallel to the guide ways 85. The air motors of the jacks 80 are controlled by the programme device 42.

FIGURE 2 shows the vanes in the optimum position for flight at Mach 5 and it will be seen that the leading edge of each vane and the lip 41 will lie in the line of the secondary shock wave 40 originating at the loading edge of the compression ramp surface 19a. The shock wave 40 is not deviated at its points of contact with the vanes because a first part 90 of the undersurface of each vane is parallel to the ramp surface 19a. The first part 91 of the top surface of each vane and of the lip 41 is arranged at a suitable small angle of incidence to the streamlines 92 of the air approaching the shock wave 40, so that a tertiary shock wave 3 is formed extending upwards and rearwards from the leading edge. At positions 94 where the shock waves 93 meet the undersurface parts 90 of the vanes these undersurface parts are terminated, and a next following undersurface part 95 extends parallel to the direction of the streamlines after refraction at the shock wave 93. The shock waves 93 are therefore not reflected downwards. The ramp surface 19a similarly ends at the relevant shock wave 93 and is followed by a surface 19b parallel to the new streamline direction.

At positions 96 a short distance behind the leading edges of the vanes the upper surface parts 91 are terminated and the next following upper surface parts 97 are at an increased angle of incidence so as to generate a new set of shock waves 98. These strike the undersurfaces of the vanes next above at positions behind the positions 94, but as the vanes are opened out with decreasing flight Mach numbers the striking positions move forward. It is necessary therefore for the upper surface parts 91 to have a minimum length such that in the worst case the striking positions are not forward of the positions 94. This means for generating shock waves, which may be repeated if desired, bends the airflow upwards to distribute it more evenly about the engine inlet centre body and assists efficient subsonic diffusion. In this example, shock waves are not generated in the narrow passage between the lip 41 and the lowermost vane 62.

The upper surface parts 97 are continued rearwards at the same inclination to positions 99 where a downward inflection occurs making next following parts 100 parallel to the undersurface of the vane or ramp member next above. A number of reflected oblique shock waves may occur in the convergent passage parts forward of the positions 99, and the parallel parts form settling zones for the normal shock waves occuring where the airspeed becomes subsonic. These zones are indicated in the drawings by an undulated line and in operation the normal shock waves may move to and fro in these zones with changes of back pressures caused by adjustment of the engine operating conditions. Rearward of the parallel settling zone the surfaces of the ramp members 19 and 20 and of the trailing end parts 60a and 61a of the first two vanes are curved to provide upwardly bent divergent passages for subsonic diffusion, the angle of divergence increasing rearwards as the Mach number of the airflow in the subsonic passage 52 progressively falls for any given flight Mach number.

As the flight Mach number is reduced the ramp structure moves generally upwards and rearwards, as already described, and the vane system opens out from the ramp structure. In effecting this opening out, which is controlled by the programming of the jacks 80 and the shaping of the guideways 85, it is important that the leading edges of the vanes should not advance forward of the secondary shock wave 40 and that the tertiary shock waves 93 originating at the lip 41 and the leading edges of the vanes should strike the surface at the inflection positions 94. FIGURE 4 shows the Mach 3 position for the present example and it will be seen that the shock waves 93 are properly located with respect to the inflection positions 94, but the leading edges of the vanes are somewhat behind the shock wave 40. This is not objectionable.

At lower flight Mach numbers the configuration departs somewhat from the optimum, especially in respect of the passage between the lowermost vane 62 and the bottom wall 16 becoming more divergent than is desirable. This objection may be overcome by arranging for the lip 41 to turn downwards to a position such as shown at 41a in chain dotted lines in FIGURE 5.

At high flight Mach numbers the air becomes highly heated by the compression. The under surface of the ramp structure and the bottom wall 16 in the region of the throat and subsonic diffuser passage are therefore necessarily protected by a layer of refractory heat insulation material 101 as shown in FIGURE 2. The vanes carry considerable air pressure loads and are therefore preferably of honeycomb construction made from a nickel base heat resisting alloy. To reduce the air pressure loading on the ramp structure (see FIGURE 1) the space above this structure may be divided in known manner into low and high pressure zones by a folding partition indicated diagrammatically at 102 (in FIGURE 1), high pressure air from passage 52 being bled off through the ramp structure to raise the pressure in the zone downstream of the partition.

An alternative arrangement for the means for deforming the deformable wall is shown in FIGURES 11 to 14.

This varies from the previously described construction firstly in that the diffuser is of the dump type, shown as 104; this considerably reduces the overall length of the intake. Although the divergence is greater in this diffuser than in 52, the losses due to breakaway are not great since the velocity is down to Mach 0.2.

Secondly, control of the partition of the deformable wall is achieved by a simple system comprising three pairs of jacks 106, 108 and 110 and two guideways 112, 114. It is seen that the deformable wall now consists of only four members 116, 118, 120 and 122; the forward end of the primary ramp 116 is merely pivotally mounted on the aircraft, and the lip 41 no longer requires to be downwardly turnable. The form of the curved rear guideways 114 achieves the object of the earlier pivot blocks, and causes the wall 122 to telescope over the adjacent fixed structure. The earlier system for positioning the vanes in relation to the deformable wall is replaced in this arrangement by having a member 124 which connects the wall member 120 to a roller 126 cooperating with the guideway 112, to be rigidly associated with a member 128 which is one of a system of links interconnecting the vanes; the associated members 124 and 128 are mounted for rotation about the pivot, 130.

A further variant feature in this arrangement is that the parallel settling zone between the vanes lies further upstream in relation to the vanes. This permits the linkage system comprising 128, 132 which interconnects the vanes, to be located within the duct downstream of the settling zones. The links are of aerofoil cross-section, and since they lie downstream of the normal shock waves they do not generate new shock waves. There is no connection between the vanes and the side walls, the latter can therefore be made smooth.

The vanes in this arrangement have no hinged portion; slight relative angular movement is achieved by having links, e.g. 128 and 132, suitably out of parallel.

A further modification is that the partition 102 of the earlier arrangement is constituted in this one by a wall, seen in section as 124. This wall has a sealed sliding engagement with member 120 and the side walls of the adjacent structure. Extending from the upper edge 134 of 124 are a pair of rollers, one being shown as 126; these engage in guideways, which are T shaped when viewed end on. The guideways nearly coincide, as seen in these figures, with the surfaces of a wall 136 having the guideway cut therein. A rubbing seal is positioned between 124 and 136, and wall 136 is sealed around all its edges to adjacent structure. It is therefore clear that the zone 138 is isolated from the zone 140. By means of this, the high pressure in the dump diffuser may be admitted through an aperture (not shown) in 120 or 122 to act in the zone 138, so eliminating a pressure differential across the walls 120, 122.

Furthermore, the pressure in that zone 138 will be higher, in operation, than that in 140, and by suitably choosing the area of the member 124, the anticlockwise bending moment arising from the pressure differential across the member 124, can be made to substantially counteract the clockwise bending moment at that pivot arising from the reaction force on the downstream part of the vanes caused by the air as the air flows upwards therefrom.

We claim:

1. A supersonic air-intake for a jet propulsion engine, and comprising a deformable wall and a U-shaped structure, the wall defining in flow sequence at least one compressor ramp, and then defining, in conjunction with the interior of the said U-shaped structure a throat portion and a diffuser portion, the intake further comprising a plurality of vanes which lie in and extend transversely to the throat portion, each vane having a tapered leading edge and a tapered trailing edge, so that the throat portion is divided by the vanes into a plurality of convergent-divergent passages; a first means adapted to deform the wall to vary the angle of the compressor ramp, and by moving relatively to said structure to vary the areas of cross-section of the throat portion and the diffuser portion, and second means adapted to simultaneously adjust each of the vanes to maintain that surface of each vane which extends from the said leading edge and which faces in the same general direction as the said deformable wall so as to lie parallel to said compressor ramp.

2. An air intake according to claim 1 in which the vanes are pivotally mounted on a system of parallel links supported from the deformable wall.

3. An air intake according to claim 2 in which at least one vane consists of two parts hinged together, the axis of which hinge lies transversely in the duct and perpendicular to the length of the duct, the downstream part of the vane being connected by a link to a part of the deformable wall which constitutes a bounding surface of the throat portion; the alignment of the link in relation to the parallel links being such as to cause the downstream part to swivel in relation to the upstream part, as the vanes are being moved in relation to the deformable wall, the swivelling motion being such that in operation the velocities of the air streams issuing from the different passages are rendered substantially equal.

4. An air intake according to claim 1, in which considering the movable wall as being on the upper side of the duct, in which at least two of the passages defined by the vanes, have leading upper surfaces lying parallel to one another, and in each of these passages the wall facing its leading upper surface is slightly inclined towards this leading upper surface in a downstream direction so that a rearwardly upwardly extending shockwave is generated from the lower leading edge of the passage, the leading upper surface being terminated downstream by an upward inflection of the surface, the inflection being located in the region of where, for one condition of operation, the shockwave strikes the upper surface, the next part of the upper surface, which lies immediately downstream of the inflection, being parallel to the direction of the air flow after being deflected by the shockwave.

5. An intake according to claim 1 and further comprising third means responsive to the Mach number of the air ahead of the intake, and adapted to act on said first and second means to control the angles of the compressor and the diffuser and of the areas and the angles of convergence and divergence of the said passages.

6. An air intake according to claim 5 in which the base wall of the U-shaped structure terminates upstream in a lip adjacent to the vanes, which vanes are disposed in echelon towards the lip, and the third means including means adapted to prevent the vanes from projecting upstream beyond a secondary shock wave from the secondary ramp.

7. An air intake according to claim 1 in which each vane is of a form to define in conjunction with at least another vane a passage having a portion the upper and lower walls of which are parallel to each other.

8. An air intake according to claim 1 in which the compression ramp portion of the deformable wall comprises primary and secondary compression ramps hinged together and operatively connected to the wall deforming means, the ramp to which surfaces on the vanes are parallel being the secondary ramp.

References Cited

UNITED STATES PATENTS

| | | | |
|---|---|---|---|
| 2,396,598 | 3/1946 | Neumann et al. | |
| 2,560,634 | 7/1951 | Colley | 138—45 |
| 2,772,620 | 12/1956 | Ferri. | |
| 2,788,020 | 4/1957 | Dauie | 138—45 |
| 2,987,878 | 6/1961 | Bogert | 138—46 |
| 3,030,770 | 4/1962 | Ranard et al. | 137—15.1 |
| 3,066,483 | 12/1962 | Stratford | 138—46 |
| 3,067,573 | 12/1962 | Connors | 138—46 |
| 3,104,522 | 9/1963 | Pennington et al. | 138—45 |

FOREIGN PATENTS

| | | |
|---|---|---|
| 932,751 | 7/1963 | Great Britain. |

LAVERNE D. GEIGER, Primary Examiner

H. K. ARTIS, Assistant Examiner

U.S. Cl. X.R.

138—45